United States Patent [19]

Barbaro

[11] Patent Number: 4,906,381

[45] Date of Patent: Mar. 6, 1990

[54] MODULAR MULTI-MEDIA FILTRATION UNIT

[76] Inventor: Ronald D. Barbaro, 7036 Lee Park Ct., Falls Church, Va. 22042

[21] Appl. No.: 261,399

[22] Filed: Oct. 24, 1988

[51] Int. Cl.⁴ .............................................. B01D 15/00
[52] U.S. Cl. .................................... 210/660; 210/130; 210/335; 210/663; 210/807
[58] Field of Search ............... 210/660, 741, 806, 807, 210/130, 132, 254, 264, 283, 284, 287, 289, 663, 669, 111, 133, 137, 236, 335, 337, 339

[56] References Cited

U.S. PATENT DOCUMENTS

| | | | |
|---|---|---|---|
| 547,547 | 10/1895 | Heideman | 210/283 |
| 590,868 | 9/1897 | Wanner et al. | 210/264 |
| 636,447 | 11/1899 | Paddock | 210/264 |
| 2,087,442 | 8/1936 | Nack | 210/283 |

FOREIGN PATENT DOCUMENTS 393215 9/1970 U.S.S.R. ............................. 210/264

Primary Examiner—W. Gary Jones
Assistant Examiner—Matthew Savage
Attorney, Agent, or Firm—Jerome J. Norris

[57] ABSTRACT

Multi-media modular filtration unit for separating solids from a fluid comprising at least two filtration modules disposed in series alignment within a water tight cabinet, wherein each module has a pressure release valve to allow fluid being filtered to bypass its clogged filtering surface to permit continuation of filtering on an unclogged succeeding surface.

12 Claims, 2 Drawing Sheets

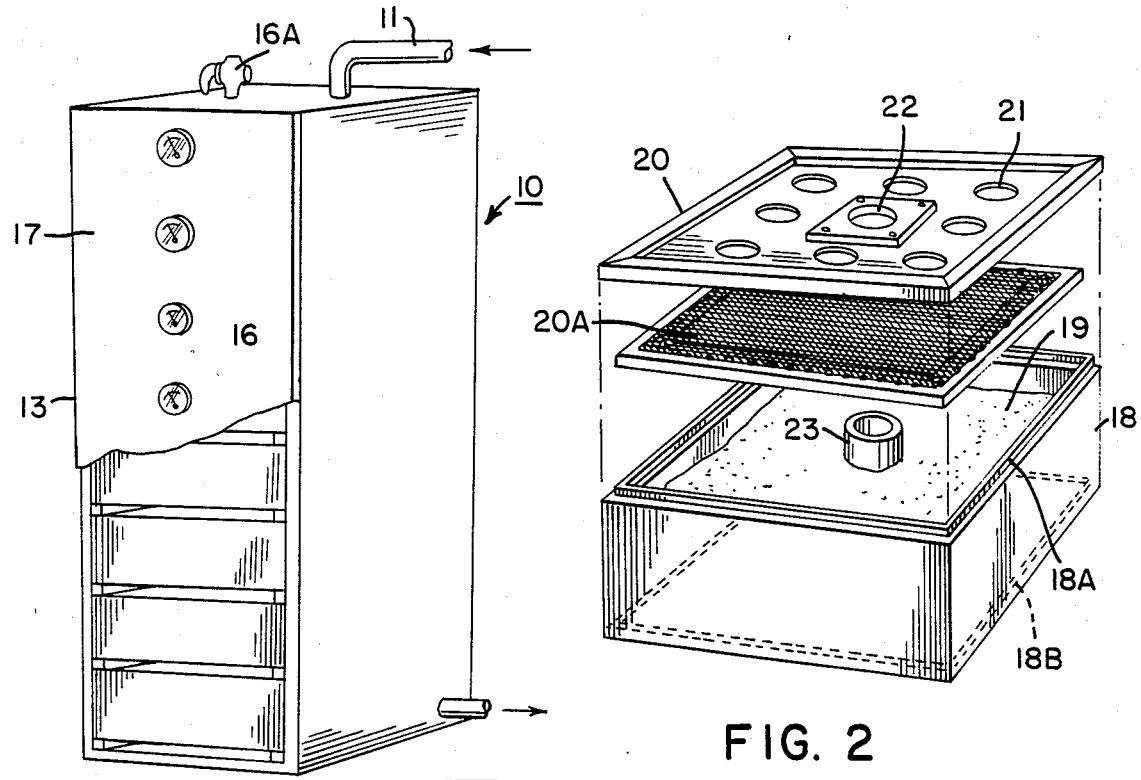
FIG. 1
FIG. 2
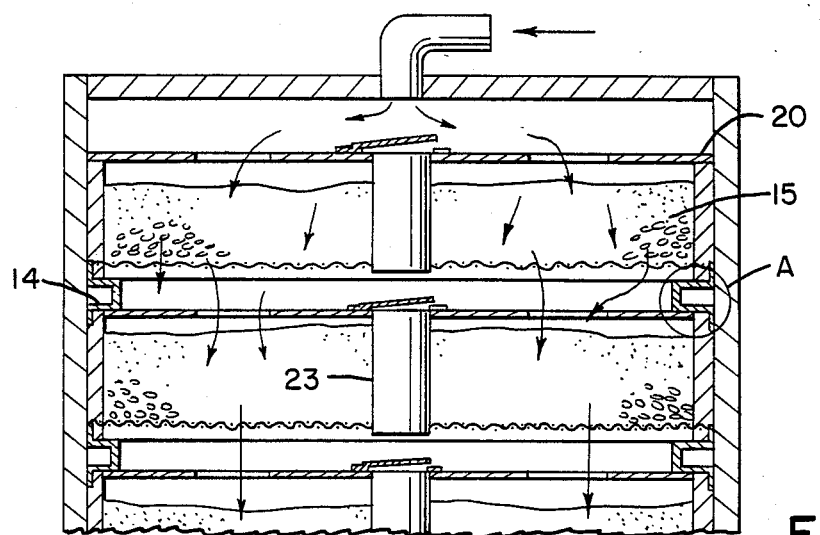
FIG. 3

MODULAR MULTI-MEDIA FILTRATION UNIT

BACKGROUND OF THE INVENTION

In the areas of water purification, waste reclamation, fruit drink preparations or other solid/liquid separation requirements, it is known that the problems encountered in these filtration processes will vary with the nature and size of the solids to be removed from the liquid phase. For example, it is known that conventional filtration units will clog as solids accumulate, and that these units must either be backwashed or removed from service in order to remove the solids.

Backwashing or removing the unit(s) from service requires an interruption or shut-down of the filtration process and therefore the amount of solids removed in a given time period is significantly reduced.

Therefore, in order to extend filter run times, the focus has been directed to determining the nature and size of the filter medium, in order to selectively remove a portion of the larger solid particles first and the smaller solid particles later, so that a greater amount of the filter capacity would be used before it becomes necessary to backwash or shut-down the filtration process.

FIELD OF THE INVENTION

In the present invention, it is to be emphasized that the nature and size of the filter medium has not been overlooked; instead, the nature and size of the filter medium together with finding ways to extend the filtration run times in the event of a clogged filter surface is the principle objective.

After selection of the nature and size of a filter medium for a solid/liquid filtration system, another objective is to devise means for extending the filtration run time in the event one filter in a unit containing at least two filtration modules becomes clogged.

A further object of the invention is to extend the filtration run time when one filter is a unit containing at least two filtration modules becomes clogged, by allowing the flow of the fluid to be filtered to bypass the clogged filter and collect on a succeeding unclogged filter.

A yet further object of the invention is to extend the filtration run when one filter in a unit containing at least two filtration modules becomes clogged, by providing each filtration module with a centrally located pressure release valve which opens as pressure above it builds due to clogging of the filter media surface, and allows the fluid to be filtered on the surface of a succeeding unclogged filter.

SUMMARY OF THE INVENTION

The invention pertains to a multi-media modular filtration unit for separating solids from a fluid, comprising at least two filtration or soluble containment removal modules disposed in series alignment within a fluid or water tight cabinet, wherein said modules individually contain variously sized sand, anthracite, plastic or glass beads, garnet, activated carbon, ion exchange resins or mixtures thereof as filtering and/or contaminant removal surfaces, (media); and wherein each module has disposed integrally therein, at least one centrally or at least one non-centrally located pressure release valve which allows fluid to bypass a clogged filter surface in order to enable filtration on a surface of a subsequent module, in order to extend filtration run times. Down flow operation is customary; however, lateral and upflow operation modes are also possible because the media is secured in place by appropriately sized plastic screens.

BRIEF DESCRIPTION OF THE DRAWINGS

FIG. 1 is a perspective view of the modular multi-media filtration unit;

FIG. 2 is an exploded view in perspective of a module of the filtration unit;

FIG. 3 is a sectional view of cut-away modular multi-media filtration unit taken along the sectional line 2—2 of FIG. 1;

DETAILED DESCRIPTION OF THE INVENTION

Figure 4:
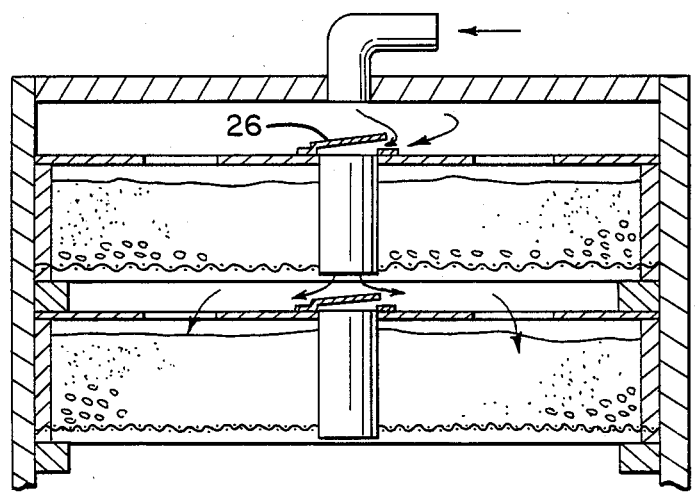
FIG. 4 is a partial view in section of two of the filtration modules.

In referring to the invention, FIGS. 1 and 3 show a modular multi-media filtration unit 10, containing an inlet conduit 11, and an outlet conduit 12, disposed in the top and bottom, respectively of a water tight cabinet 13, preferably constructed of 0.50" rigid plastic or aluminum. Valves (not shown) are disposed in the inlet and outlet conduits to control the influx and exit rate of the water being filtered. To insure the integrity of water tightness, all joints of the unit are sealed with silicone sealant. The dimensions of the unit are preferably 16"×16"×48" tall, and the unit is designed to hold six modules snugly. Larger units are to scale.

In order to hold the modules in place, without regard to the orientation of the unit, hard rubber gaskets are glued and screwed in place on appropriate lengths of 1"×0.5" aluminum strips (14) which are affixed over hard rubber gaskets to three interior walls of the unit with screws (as shown) above and below each module thereby providing a slot into which each module 15, fits, and a space of about 1.5" between each module. A fourth removable wall or front panel (not shown) has no strips affixed thereto, and its interior surface is covered with a 2'×4'×1" thick rubber mat (not shown) which seals tightly against the modules, aluminum support strips and edge of the box as the fourth side of the unit. This removable wall allows access to the modules and inspection of the modules in-situ after a filtration test, without distrubing the modules.

To monitor pressure at and across each module, 30 p.s.i. gauges (16) are installed into the 1.5" space above and below each module through a recessed rear wall 17, which together with extended top, bottom and side walls of the unit provide protection for the protruding gauges 16.

A manually operated petcock relief valve 16A, is installed through the top of the water tight unit to permit escape of trapped air during start-up or stoppage of the filtration process. A similar valve installed through the bottom of the water tight unit allows drainage by gravity and use in alternate flow modes.

FIG. 2 depicts an individual module which is not aligned in series within a water tight cabinet as in FIG. 1. The individual module is constructed of aluminum. The bottom section 18, with raised rail 18A, may be filled with a bed of filtering and/or sorbent, and or ion exchange medium 19, composed of sand, anthracite, inert beads, activated carbon, an ion exchange resin, or mixtures of any two or more supported by a plastic lower screen 20A with screw holes and a soft rubber bead seal to hold the screen in place. Cloth, netting or foraminated material is disposed across the top of the bottom section and across the bottom of the top aluminum frame section 20, having a plurality of circular openings 21, and surrounding a central opening 22, which fits in seal tight registry over a tubular opening 23, in the bottom section of the module. Once the top and bottom sections are fastened together, i.e., by screws (into the shown screw holes) or other suitable means, gaskets are placed between the module and the internal walls of the unit in order to prevent external bypassing of the module during filtration and backwash modes. The bottom of the lower frame section 18 is made of a soft rubber grooved surface 18B to accept the raised rail surface from a lower module.

Figure 5:
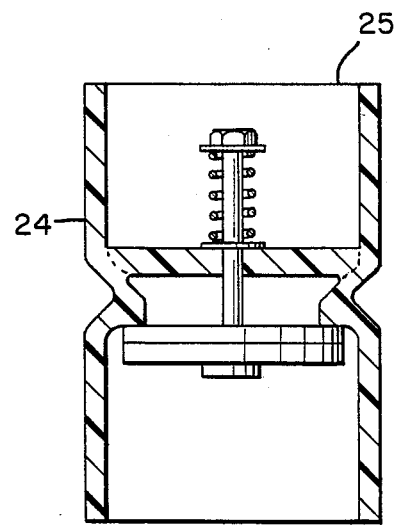
FIG. 5 is a sectional view of the centrally located pressure release valve contained in each module.

To prevent internal short circuiting and bypassing during filtration and backwash modes, nine equally spaced holes are made in both the top and bottom (not shown) of each module. In the tubular center hole or opening of each module is disposed a bypass pressure release valve 24, with a valve inlet 25, as shown in FIG. 5. The valve inlet is covered by an aluminum baffle 26, to prevent premature opening of the bypass valve. To hold the valve in place, braces are made from 4×4×0.25 inch aluminum to create sleeves (not shown) in the center hole, into which the valve fits.

The screens, cloth, netting or foraminated material contained in the top section below the nine equally spaced holes and above the nine equally spaced holes in the bottom sections of each module serve to hold the filter bed material.

Valve 24, is a 2" polypropylene, in line, pressure release valve which is rated to release at 4.0 p.s.i.g. pressure differential. The pressure release valve may be manually adjusted to release at a preset pressure. When the clogged filter bed surface in a preceding module creates this release pressure differential, the bypass valve is opened to enable the initial filtering to commence on the bed or filter surface of a subsequent module, thereby extending filtration run times before shutdown or backwashing is necessary.

Figure 6:
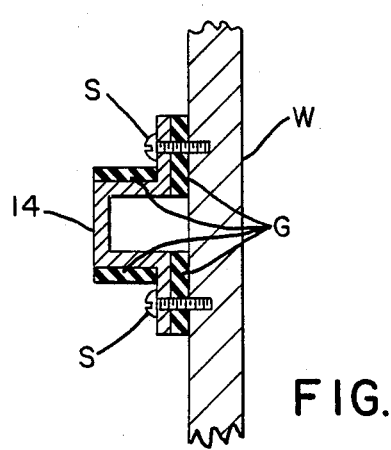
FIG. 6 is an enlarged view in perspective of section A of FIG. 3.

FIG. 6 shows how the aluminum strip 14, is attached to the cabinet wall (W) over the hard rubber gaskets (G) by screws (S).

It is to be understood that any module can be filled with one or a mixture of the filtration media, and the number and size of the several modules can be varied depending upon the type and capacity of filters needed in the hydraulic filtration process, and to flow directional mode may be upflow, downflow or lateral, and many variations can be made without departing from the spirit and scope of the invention, which is defined by the appended claims.

What is claimed is:

1. A process of filtering using a multi-media modular filtration unit for separating solids from a fluid, comprising:
   passing said fluid through an influx conduit under pressure into the first of at least two filtration modules disposed in alignment for series flow within a water tight cabinet containing filter media therein, until the filter surface of said first module is clogged sufficiently to create a pressure to open a centrally located bypass pressure release valve located in a tubular opening through the filter media to allow said fluid to bypass said clogged surface and impinge on the unclogged surface of the second module having a centrally located pressure release valve therein identical to the bypass pressure release valve in said first module wherein said filter media varies in media particle size from a preceding module and varies in depth from a preceding module and contains different media from a preceding module; wherein said media in said first and sequential modules are sized to remove larger particles first, medium particles next, and finer particles last, in order to extend the run time of the filtering process.

2. The process of claim 1, wherein the filter media is held securely within each module by appropriately sized screens, cloth, netting or foraminated material.

3. The process of claim 1, wherein fluid flow is upflow, downflow or lateral flow.

4. The process of claim 1, wherein six filtration modules are disposed in alignment for series flow.

5. The process of claim 4, wherein the filter media comprises various sized inert spheres of sand, anthracite, activated carbon, ion exchange resins and mixtures thereof.

6. The process of claim 4, wherein said bypass pressure release valve is set to release at about 4 p.s.i.g. upon clogging of a filtering surface.

7. The process of claim 4, wherein said bypass pressure release valve is manually adjusted to release at a pressure which will maximize effective run time for each specific raw water supply.

8. A multi-media modular filtration unit for separating solids from a fluid comprising, at least two filtration modules disposed in alignment for series flow within a watertight cabinet having fluid influx and outlet conduits, wherein each module has a filter media contained therein, at least one centrally located tubular opening passing through the filter media and having a bypass pressure release valve in said tubular opening that is preset to open at a predetermined pressure and allow filtration to proceed on an unclogged filtering surface of the subsequent module, in order to extend filtration run times.

9. The unit of claim 1, wherein three to eight filtration modules are disposed in alignment for series flow and wherein the filter media comprises absorbents or exchange resins.

10. The unit of claim 8, wherein the filter media in each module comprises various sizes of inert spheres, sand, anthracite, activated carbon, ion exchange resin and mixtures thereof.

11. The unit of claim 8, wherein said bypass pressure release valve is set to release at about 4 p.s.i.g. upon clogging of the filtering surface.

12. The unit of claim 8, wherein said bypass pressure release valve is manually adjusted to release at a preset pressure selected to maximize effective run times for specific raw water sources.

* * * * *